Patented May 29, 1928.

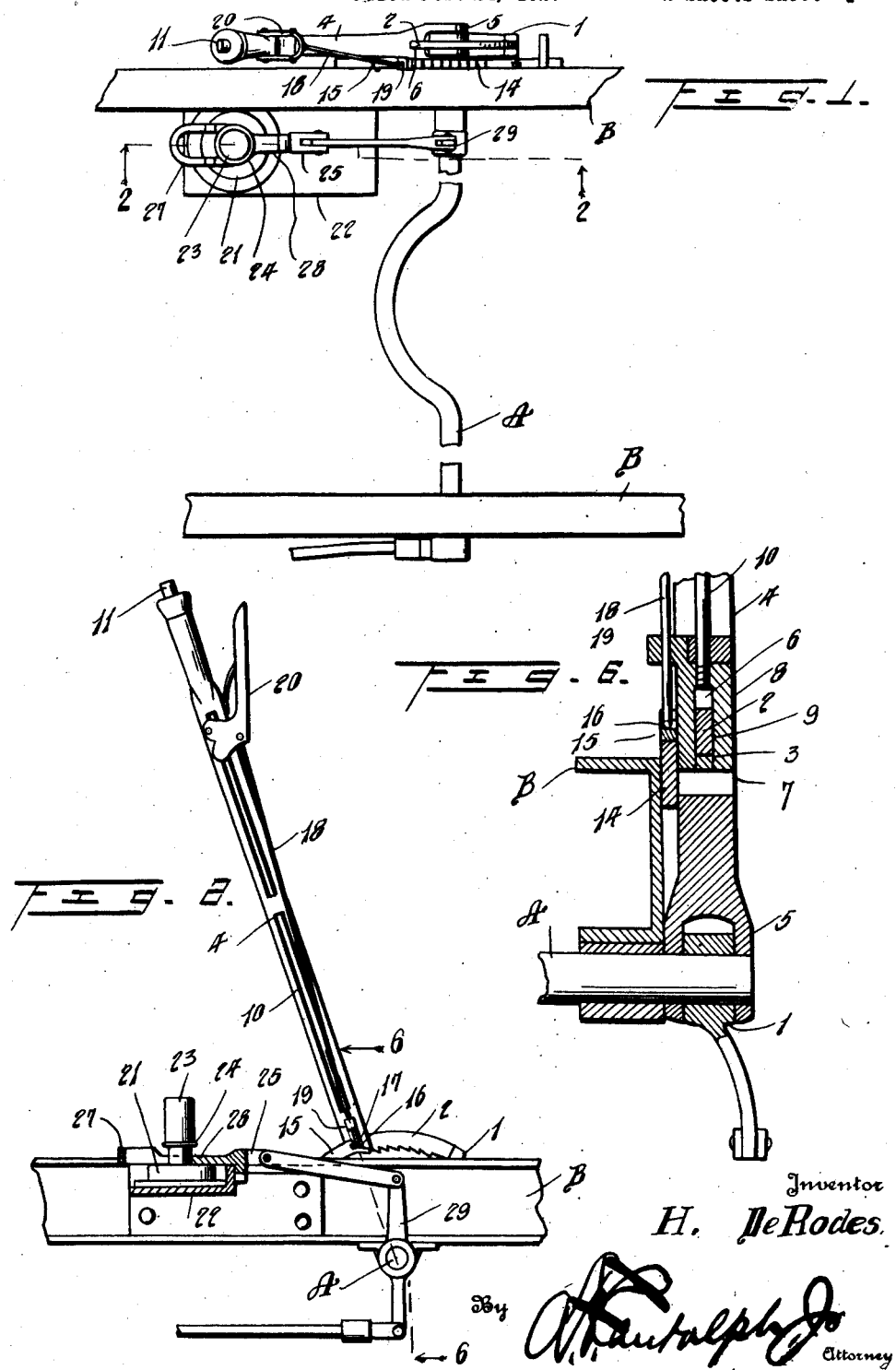

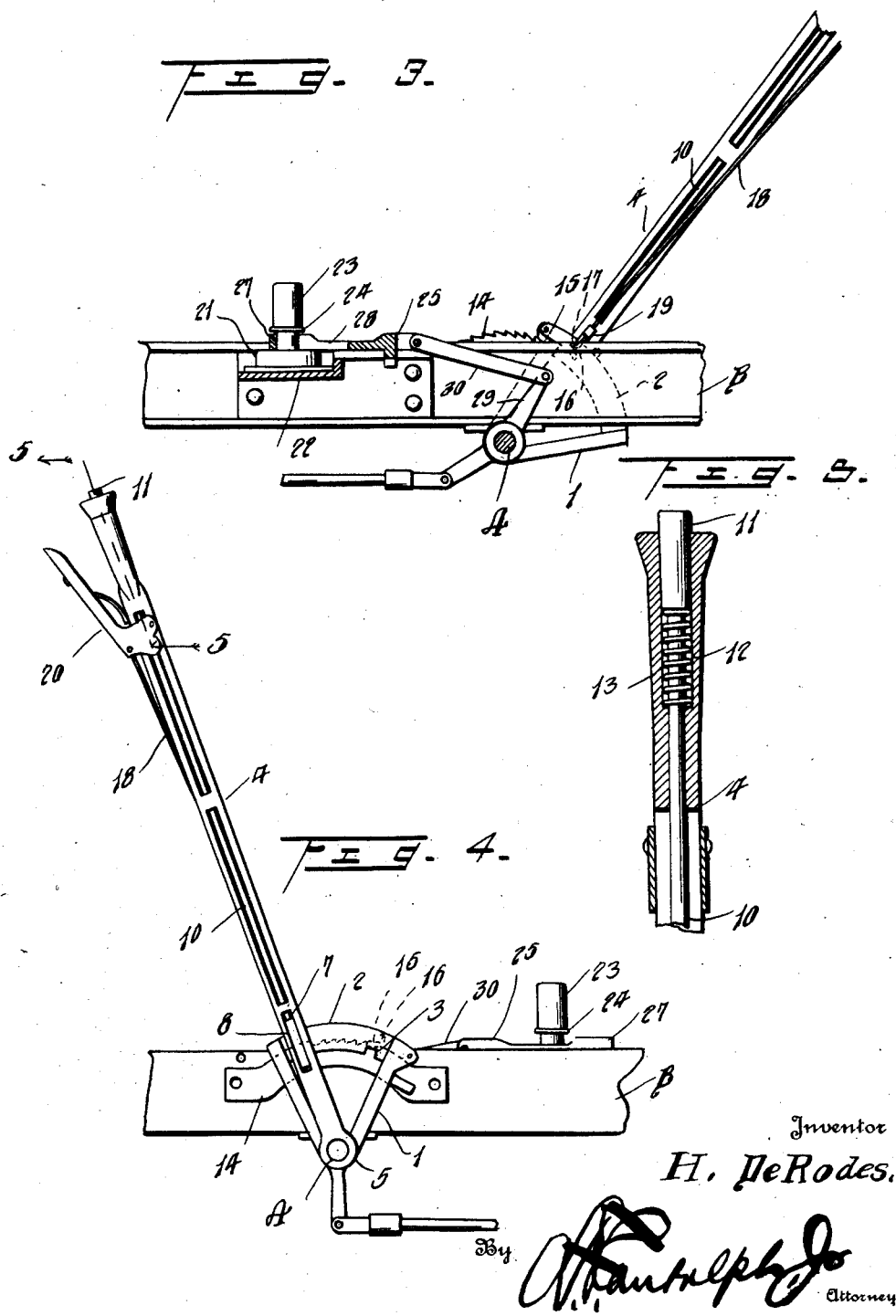

1,671,815

UNITED STATES PATENT OFFICE.

HARRY DE RODES, OF NORTH BALTIMORE, OHIO, ASSIGNOR OF ONE-HALF TO PEARL M. DE RODES, OF NORTH BALTIMORE, OHIO.

LEVER-CONTROL SHIFTING MECHANISM.

Application filed February 24, 1927. Serial No. 170,544.

The invention relates to an improved construction of means for mounting a control shaft by a lever and has for its principal object the provision of a construction by which the control lever is latched to the shifting mechanism so that it may be released therefrom to be moved into a position that will be out of the way of the operator when the shifting mechanism is applied.

The device is particularly applicable to means for setting the brakes on automobiles to provide a construction by which the lever may be moved from a brake setting position to a forward position so that the lever will be out of the way of the operator in leaving his seat or resuming his position in the automobile, it will be understood, however, that the invention may be used in connection with lever shifting mechanisms generally.

The invention will be described in detail hereinafter and will be found illustrated in the accompanying drawings in which Figure 1 is a plan view of an automobile frame shown fragmentarily and showing the improved lever control shifting mechanism applied thereto, and also the means for controlling the operation of the starting switch, Figure 2 is a view taken on a plane indicated by the line 2—2 of Figure 1 showing the parts in position in applying the brakes, Figure 3 is a view on the same plane showing the brakes released, Figure 4 is a side view of the automobile frame showing the brakes applied and the lever in releasing position, Figure 5 is a detail on a plane indicated by the line 5—5 of Figure 4, and Figure 6 is a detail on a plane indicated by the line 6—6 of Figure 2.

In the drawings similar reference characters will be used to designate corresponding parts throughout the several views.

As shown in the drawings the lever controlled shifting mechanism is applied to a brake controlled shaft A, journaled on side beams B of an automobile frame and comprises a segment including an angular frame 1 secured to the shaft A and turnable therewith, and an arcuate plate 2 connecting the ends of the arms of said angular frame and provided with a notch 3. 4 designates the control lever having its lower end bifurcated as shown at 5 to straddle the frame 1 and connected with the shaft A and is mounted to turn on the shaft. Lever 4 is provided with opening 6 to receive the arcuate bar 2 and is also provided with another opening 7 arranged transversely of the opening 6 in which is slidably mounted a detent 8 having an opening 9 to receive the arcuate bar 2, and is adapted to engage in the notch 3 to latch the lever for movement of the segment therewith. 10 designates a rod secured to the detent 8 and extending upwardly to the upper end of the lever 4 and having a head 11 thereon engaging in an opening 12 in the end of the lever, 13 being a spring that normally projects the head 11 outwardly of the end of the lever and also actuating the detent 8 to engage the notch 3.

Secured to one of the side beams B is a ratchet segment 14, and 15 designates a pawl pivotally engaging the frame 1 to engage the teeth of the ratchet segment 14 to hold the shaft A in adjusted position, said pawl 15 being provided with a notch 16 to receive the angular end 17 of rod 18 slidably mounted in guide 19 of the detent 8, said rod 18 being actuated by means of hand grip 20 of the usual type employed in shifting levers.

It will be understood that in operation the brakes may be set by moving the lever 4 and with it the segment frame 1 rearwardly and the pawl 15 by engaging the ratchet segment 14 will hold the brakes set. When in a set position the lever 4 may be released to be moved forwardly independently of the segment frame 1 by pressing downwardly on the head 11 to release the detent 8 from engagement with the notch 3. To release the brake if the detent 8 is in engagement with the notch 3 the hand grip 20 will be actuated to lift the pawl 15 from engagement with the ratchet segment 14 and the lever may then be swung forwardly.

The invention also contemplates controlling the operation of the starting switch by the position of the brake controlled shaft A, the starting switch being indicated at 21 and secured to a bracket 22 that may be mounted as shown on one of the side beams B or in any other suitable position, 23 designating the plunger of the starting switch and having a flange 24 thereon. 25 indicates a link slidably mounted on the bracket 22 and having a slot to receive the plunger 23 under the flange 24, said link 25 being wider in one portion as shown at 27 than at the other as shown at 28, the wider portion by engaging under the flange 24 holding the plunger 23 to prevent movement thereof to operate the switch. 29 indicates an arm on the shaft A and 30 a link connecting said arm with the link 25.

In operation it will be apparent that when the shaft A is turned to set the brakes as hereinbefore described, the link 25 will be moved into position so that the portion 28 will be under the flange 24 and operation of the plunger 23 may be effected to close the switch to start the motor of the automobile, and when the brake is released the arm 27 will be moved under the flange 24 and hold the switch from operation, thus making it impossible to start the motor unless the brakes are set.

What is claimed is:—

1. In a lever controlled shifting mechanism, a shaft, a segment frame turnable with said shaft, a lever turnable on the shaft, means to latch the lever and segment frame together for simultaneous movement, a ratchet segment suitably secured, a pawl pivoted on the segment frame and engageable with said ratchet segment, said pawl having a notch therein, and a hand grip operated rod on said lever and having a hook engaging in said notch.

2. In a lever controlled shifting mechanism, a shaft, a segment frame turnable with said shaft and having a notch therein, a lever turnable on the shaft, a detent slidably engaging the lever and engageable with said notch to latch the lever and segment frame for simultaneous movement, a ratchet segment suitably secured, a pawl pivotally engaging the segment frame and having a notch therein, and a hand grip operated rod on said lever and having a hook member engaging in said notch.

In testimony whereof I affix my signature.

HARRY DE RODES.